United States Patent
Morin et al.

(10) Patent No.: US 8,485,090 B2
(45) Date of Patent: Jul. 16, 2013

(54) DRINK PREPARING MACHINE INCLUDING A STEAM NOZZLE CLEANING SYSTEM

(75) Inventors: Gilles Morin, Varois et Chaignot (FR); Vincent Crosville, Paris (FR); Laurent Gagnon, Caen (FR)

(73) Assignee: SEB S.A., Ecully (FR)

( * ) Notice: Subject to any disclaimer, the term of this patent is extended or adjusted under 35 U.S.C. 154(b) by 358 days.

(21) Appl. No.: 12/934,818

(22) PCT Filed: Mar. 13, 2009

(86) PCT No.: PCT/FR2009/000275
§ 371 (c)(1),
(2), (4) Date: Sep. 27, 2010

(87) PCT Pub. No.: WO2009/122039
PCT Pub. Date: Oct. 8, 2009

(65) Prior Publication Data
US 2011/0023723 A1     Feb. 3, 2011

(30) Foreign Application Priority Data
Mar. 26, 2008   (FR) ..................................... 08 51951

(51) Int. Cl.
  *A23F 3/00*   (2006.01)
(52) U.S. Cl.
  USPC ........................................................ 99/323.3

(58) Field of Classification Search
  USPC ............ 99/290, 316, 279, 301, 285; 134/117, 134/198; 222/148
  See application file for complete search history.

(56) References Cited

U.S. PATENT DOCUMENTS
4,450,987 A * 5/1984 Boettcher et al. ............. 222/641
6,769,627 B2   8/2004 Carhuff et al.
7,707,927 B2   5/2010 Boussemart et al.

FOREIGN PATENT DOCUMENTS
EP        1656863 A1    5/2006
WO    WO03091152 A2   11/2003

* cited by examiner

*Primary Examiner* — Geoffrey S Evans
*Assistant Examiner* — Brandon Harvey
(74) *Attorney, Agent, or Firm* — Browdy and Neimark, PLLC

(57) ABSTRACT

Beverage preparation machine comprising a body (2), a movable steam nozzle (7) connected to the body by a moving device (13), a beverage preparation area (10) in which a cup can be placed, and a cleaning area in which is disposed a rinsing container (12). The moving device (13) moves the nozzle (7) between the preparation and cleaning areas. The machine also includes a cleaning product outlet (56) that can be moved between a dispensing position located in the cleaning area for dispensing product into the container (12), and a storage position located outside the cleaning area. The cleaning product outlet (56) is connected to the moving device (13) so as to place this outlet in the storage position when the nozzle (7) is in the cleaning area.

21 Claims, 4 Drawing Sheets

DRINK PREPARING MACHINE INCLUDING A STEAM NOZZLE CLEANING SYSTEM

BACKGROUND OF THE INVENTION

The present invention relates to a beverage preparation machine, and particularly though not exclusively to an espresso-type coffee machine that includes an outlet nozzle for steam or other liquids such as milk. These nozzles, called steam nozzles, are immersed into the beverage. They subsequently require a cleaning of at least their outside surface that has come in contact with the beverage. More particularly, the invention relates to a beverage preparation machine comprising:

- a body;
- a movable steam nozzle connected to the body by a moving device;
- a beverage preparation area in which a cup collecting the beverage can be placed;
- a cleaning area which is separate from the preparation area and in which is disposed at least one rinsing container for the nozzle, the moving device being capable of moving the nozzle between the preparation and cleaning areas.

Cleaning a steam nozzle, for example after preparing a cappuccino or a latte, is time-consuming since conventionally, it requires a wet cloth or a container of water and cleaning product. Consequently, after the preparation of a beverage, the steam nozzle is quite often left covered with residue, particularly in the case of a home machine used by several people. Cleaning it becomes even more difficult after traces of milk have dried on the outside wall of the nozzle. It is then practically essential to let the nozzle soak in a container containing a cleaning solution, typically water mixed with a cleaning product like a detergent. Yet the presence of a container, a source of hot water if the machine does not have one, and particularly a bottle of cleaning product near the machine is not very satisfactory. Aside from the space issues, it is necessary to make sure that the bottle of cleaning product is actually present, that it still contains some liquid, that this liquid is measured out correctly by the users, and that it is not within reach of children. To avoid altering the flavor or appearance of a beverage prepared afterwards, it is also important to thoroughly rinse or wipe off the nozzle after it is cleaned.

All these inconveniences mean that the cleaning of a steam nozzle is often neglected, even though in certain machines it is relatively easy to manually move the steam nozzle in order to immerse it into a receptacle placed next to the cup rest.

Moreover, there are systems, known particularly from the document WO03091152A, for automatically cleaning a nozzle similar to a steam nozzle. These systems place the nozzle in a relatively closed chamber and dispense a cleaning solution under pressure through the nozzle. The vigorous agitation of the liquid around the nozzle cleans it. However, the main purpose of these systems is to clean out the internal conduits through which a product, like milk, that is susceptible to bacterial contamination has circulated. These systems require solenoid valves and complex and expensive dosing devices. Aside from having to switch the nozzle between a beverage supply and a supply of water under pressure, it is necessary to provide for the delivery into the conduits of a cleaning product in precise doses, on the order of a few percent of the water flow. These systems operating under pressure are therefore costly, especially since it is necessary to guarantee high degrees of watertightness and operational reliability in order to avoid dispensing a residue of cleaning solution along with the beverage.

BRIEF SUMMARY OF THE INVENTION

Thus, the object of the present invention is to provide a solution that is an alternative to the existing steam nozzle cleaning systems and that offers advantages in a home use context, whether by simplifying the cleaning operations for the user or by offering a simple structure that can be integrated into a home appliance at an acceptable cost.

To this end, the subject of the present invention is a machine of the aforementioned type, characterized in that it also includes a cleaning product outlet which can be moved between a dispensing position located in the cleaning area and adapted for dispensing the cleaning product into the container, and a storage position located in a storage area separate from the cleaning area, and in that the cleaning product outlet is connected to the device for moving the nozzle by a linkage capable of placing said outlet in the storage area when the nozzle is placed in the cleaning area.

The cleaning product outlet, which can be embodied by a spout or any other orifice opening into the open air, makes it possible to dispense precise quantities of the cleaning product, even if it is a highly concentrated liquid, given that the flow is under low pressure.

Moreover, the fact that this outlet is moved into a storage position during the cleaning of the nozzle prevents any undesirable addition of cleaning product, particularly during the rinsing of the nozzle. It will be noted that the movement of this outlet is produced by means of a linkage with the device for moving the nozzle and that consequently, this arrangement does not substantially increase the complexity of the machine. Furthermore, this feature facilitates production and makes it possible to use particularly simple components. In fact, if the cleaning liquid dosing device is not absolutely watertight, or if a liquid residue downstream from this device leaks out after the dosing, it has no negative consequences on the rinsing of the nozzle. Reliability is also increased because a simple mechanical linkage, even a rigid linkage, makes it possible to guarantee the placement of the outlet in the storage position.

In preferred embodiments, any of the following features can also be employed:

- the linkage between the nozzle and the cleaning product outlet is rigid and preferably formed by an arm that pivots around a vertical axle;
- the body has a housing delimiting the cleaning area, said housing being arranged so as to receive the nozzle and to allow it to be inserted into the rinsing container, while preventing the insertion of a standard size cup into the cleaning area thus delimited;
- the rinsing container is removably mounted in the housing delimiting the cleaning area;
- the cleaning product outlet is located inside the body in a storage position, preferably above a collecting tray;
- the rinsing container includes a draining device capable of evacuating the liquid contained in said container;
- the moving device is an electromechanical device automatically controlled by an electronic control unit, and includes a horizontally moving mechanism, preferably formed by an arm pivoting around a vertical axle, which is capable of moving the nozzle from the beverage preparation area to the cleaning area;
- the moving device includes a vertically moving mechanism supported by the horizontally moving mechanism and capable of moving the nozzle from an upper position to a lower position in which it enters either the cup for receiving a beverage or the rinsing container;

the cleaning product outlet is formed by the opening of a tube connected to an electromechanical valve controlled by an electronic control unit;

the cleaning product is a concentrated liquid contained in a reservoir that is located above the cleaning product outlet and feeds the latter by gravity.

BRIEF DESCRIPTION OF THE SEVERAL VIEWS OF THE DRAWING

Other features and advantages will emerge from the following description given as a nonlimiting example in reference to the drawings, in which.

DETAILED DESCRIPTION OF THE INVENTION

In the various figures, identical references designate identical or similar elements.

Figure 1:
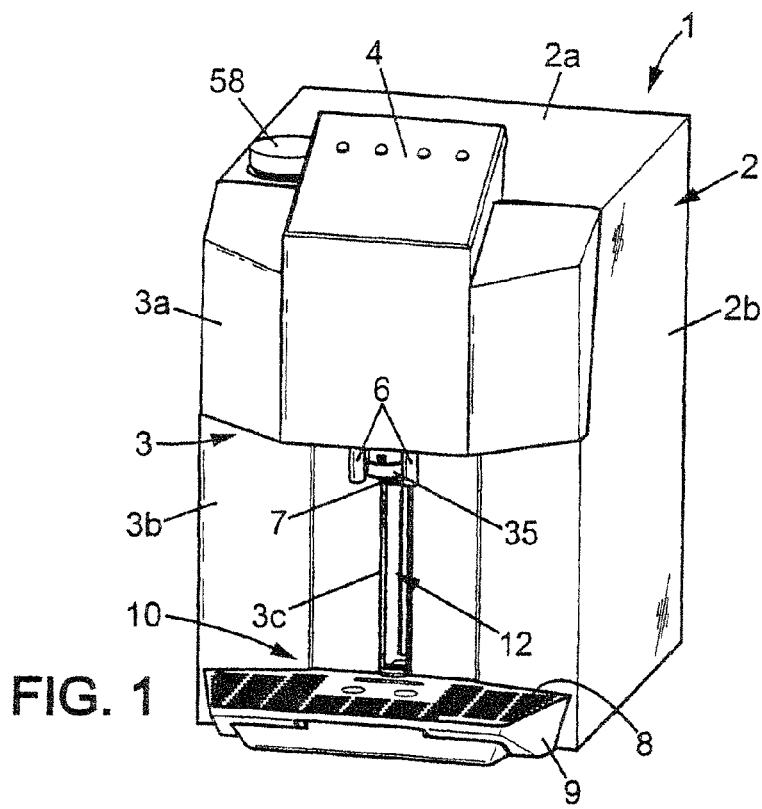
FIG. 1 is a perspective view of a coffee machine comprising a steam nozzle and a cup rest, as well as a system for cleaning the nozzle according to the invention.

FIG. 1 shows a beverage preparation machine 1, and more particularly an espresso coffee machine for home use. Such a machine can be easily installed by simply plugging it into an electrical outlet, without connecting it to a water line or a drain line.

The machine 1 has a generally parallelepiped body 2 with, in particular, a top face 2a, side faces 2b and a facade 3. The facade 3 has an upper part 3a that is prominent relative to a lower part 3b. The upper part 3a of the facade includes a control panel 4 equipped with buttons connected to an electronic control unit, not shown, making it possible to control the operation of the machine as automatically as possible.

Disposed underneath the prominent part 3a of the facade are two outlets for a beverage, in this case coffee. These outlets 6 can be moved vertically so as to adapt to the height of the cup, but this is not essential, and only one outlet may be provided.

Figure 2:
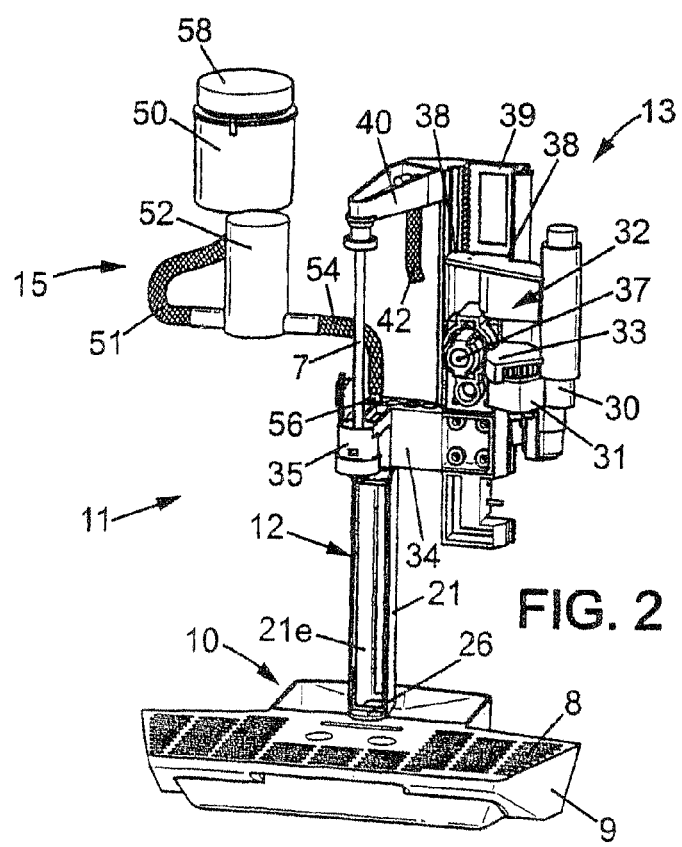
FIG. 2 is a cutaway perspective view of the cup rest, the nozzle and the cleaning system of FIG. 1.
Figure 5:
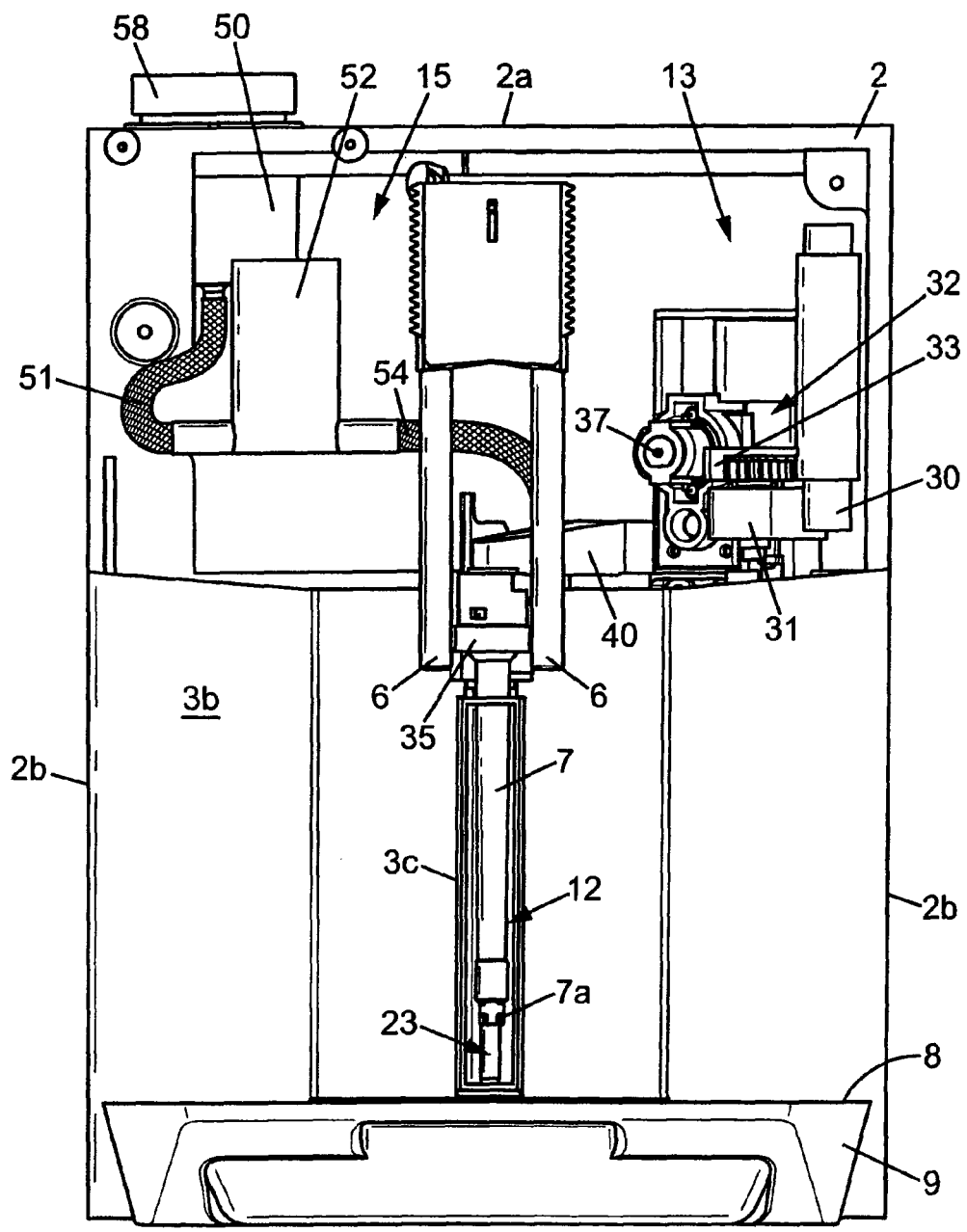
FIG. 5 is a front view of FIG. 4 in which the steam nozzle has been lowered.

Also disposed underneath the prominent part 3a of the facade and behind the outlets 6 is a movable steam nozzle 7, more clearly visible in FIGS. 2 and 5.

In a way that is well known, the body 2 includes a brewing unit for dispensing coffee through the outlets 6, preferably automatically, using internal supplies of ground coffee and water.

Likewise, the body 2 includes a steam generator capable of delivering steam to the nozzle 7, but also hot water under low pressure. This device for supplying steam and water to the nozzle 7 may be formed by any known means, including a boiler. The supply of water or steam is produced by means of solenoid valves controlled by the electronic control unit.

Disposed in the lower part of the facade 3 is a cup rest 8 for supporting one or two cups for collecting the beverage dispensed through the outlets 6 and/or prepared by means of the steam nozzle 7. It is possible, however, for the cup rest to be formed directly by the work surface on which the machine rests.

The cup rest 8 is perforated and a collecting tray 9 is disposed underneath it for the purpose of collecting splashes and overflows of liquid.

The machine 1 thus has a beverage preparation area 10 defined by the space extending from the cup rest 8 up to the coffee outlets 6 and the steam nozzle 7 in the upper position, and more generally up to the underside of the prominent top part 3a of the facade 3. This preparation area 10 is delimited at the rear by the lower part 3b of the facade, which is slightly curved. However, the preparation area could be in the form of a niche laterally delimited on three sides by the facade.

The steam nozzle 7 is vertically movable inside the preparation area 10 by a mechanism which will be described in detail below. The vertical mobility of the nozzle 7 is determined so that its free end 7a, more clearly visible in FIG. 5, can descend into a cup placed underneath the outlets 6. It is thus possible to dispense steam through the free end 7a of the nozzle in order to reheat the beverage, and possibly emulsify it by dispensing air along with the steam. It is possible to place the nozzle in a higher position in order to dispense a product, for example milk foam on top of a coffee beverage, for example using an accessory that uses the steam to create an air/milk mixture at the end of the nozzle.

In order to clean the steam nozzle 7 after it has been immersed in a beverage like an espresso, a latte macchiato, a cappuccino or a hot chocolate, the machine includes a cleaning system 11, the main components of which are shown in FIG. 2. It is essentially composed of a rinsing container 12, a device 13 for moving the steam nozzle 7 and a device 15 for dispensing a cleaning product.

Figure 6:
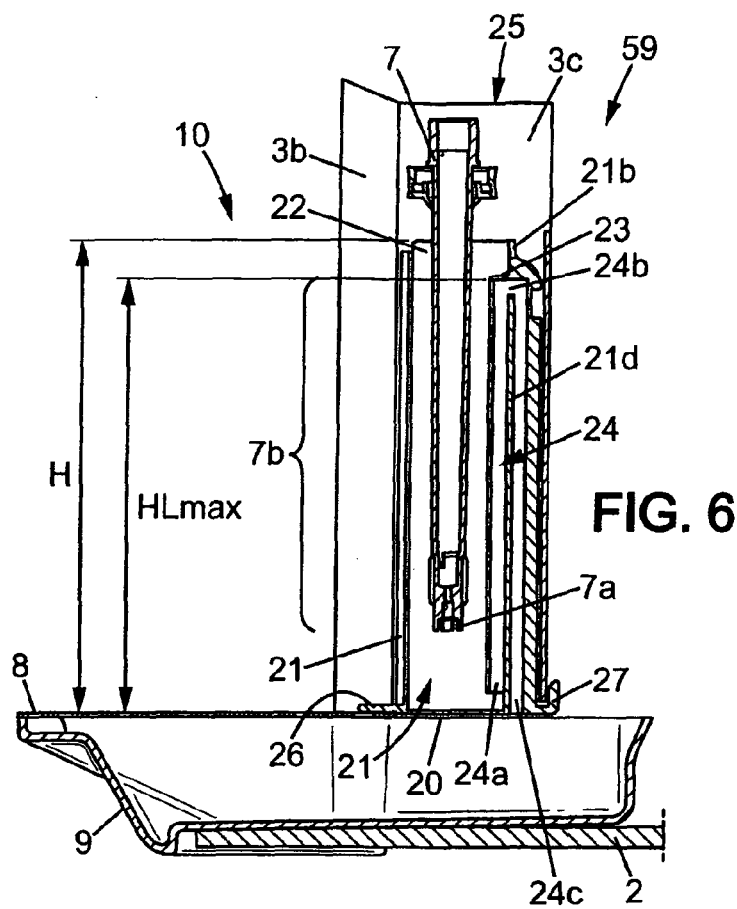
FIG. 6 is a simplified sectional view of the cup rest and a rinsing container of the cleaning system.
Figure 7:
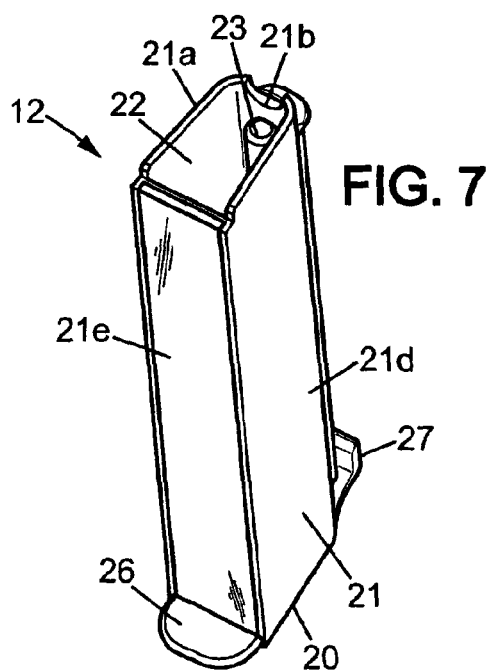
FIG. 7 is a perspective view of the container of FIG. 6.

As seen more clearly in FIGS. 6 and 7, the rinsing container 12 has a bottom 20 from which the annular wall 21 extends up to a top opening 22 delimited by the top perimeter 21a of the wall.

The top perimeter 21a of the annular wall 21 has a notch 21b which constitutes an overflow outlet via which excess liquid flows out from the side of this notch 21b.

The rinsing container 12 also includes a draining device 23 that enables a near-complete evacuation of the liquid contained in the container. The container is drained in response to a command, or a series of commands, from the electronic control unit.

The height H, indicated in FIG. 6, of the rinsing container 12 is relatively substantial so that it can accommodate the portion of the nozzle that has been immersed in a beverage. Because of the presence of an overflow outlet 21b and a draining device 23, the height H of the container 12 is greater than that of most of the cups used with the machine.

The portion of the nozzle 7 that is susceptible to being soiled is a portion 7b extending in a straight line from the free end 7a and having a substantially constant cross-section, in this case circular in shape. The wall 21 of the container 12 is advantageously disposed so as to surround the rectilinear portion 7b of the nozzle relatively closely. This makes it possible to minimize the quantity of liquid required to clean or rinse the nozzle. In this case, the container 12 has a cross-section that is substantially trapezoidal with a rounded vertex. This vertex corresponds to the rear portion 21d of the annular wall 21. The rear 21d, front 21e and side portions of the wall 21 of the container 12 are disposed in proximity to the nozzle 7, particularly at a distance of less than two times the maximum external diameter of the portion 7b of the nozzle 7, and as shown, at a distance of less than one times the external diameter of the latter.

It has proven particularly advantageous to embody the draining device 23 by means of a conduit 24, more clearly visible in FIG. 6, forming a siphon. The conduit 24 has an inlet 24a located inside the container 12 and in proximity to its bottom 20, a rectilinear vertical portion extending up to a bend 24b, then another vertical portion descending to an outlet 24c located outside the container, and more precisely on the lower surface of the bottom 20. It is understood that the conduit 24 forms a siphon which is activated when the level of the liquid in the container reaches the maximum level HLmax defined by the top of the bend 24b. But as long as the liquid remains at a predetermined level located below this maximum level HLmax, the siphon is not activated. By choosing a predetermined level located below the level of the base of the bend 24b, there is no leakage of liquid through the outlet 24c of the conduit.

The drainage conduit 24 is disposed on the rear portion 21d of the wall of the container 12. The front portion 21e of the wall is flat and made from a transparent sheet. It thus constitutes a front face through which the movements of the nozzle 7 and the draining of the container 12 can be seen.

The rinsing container 12 thus embodied constitutes a container that is specific, both in its overall shape, which is narrow and vertically elongated, and in the presence of a draining device 23 and the other features of the embodiment.

In order to make it possible to clean the nozzle 7 by inserting it through the top opening 22, the container 12 is disposed in a very precise position relative to the body 2 of the machine.

Thus, the facade 3, and more particularly the lower part 3b of same, includes a recessed housing 3c; see FIGS. 1 and 5. The recessed housing 3c extends vertically along the entire height of the lower part 3b of the facade so as to form a front opening in this facade.

The housing 3c has a trapezoidal cross-section whose larger base is located on the side of the facade 3. The cross-section of the housing 3c is adapted so as to tightly receive the rinsing container 12, so that the latter is completely contained in this housing. The transparent front face 21e is thus made flush with the extension of the facade 3. There is no interference between the rinsing container 12 and the cups that can be placed in the beverage preparation area 10. Moreover, the front opening of the housing 3c is narrow enough to prevent any insertion of a cup.

As may be seen in FIG. 6, the bottom end of the housing 3c is wide open so that it communicates with the collecting tray 9, which extends underneath this recessed housing 3c and even beyond it. This lack of a bottom in the housing 3c makes it possible to collect in the tray 9 any overflow from the container 12. The top part of the housing 3c is also open, so that the cleaning area 25 defined by this housing extends over the rinsing container 12.

The container 12 has at the base of its front face 21e a tab 26 that constitutes a grasping element and rests on the cup rest 8 located at the base of the housing 3c. This tab 26 and the rear portion 21c of the wall of the container that rests against the bottom of the housing make it possible to hold the container 12 in place.

The container 12 is advantageously mounted in the housing 3c so as to be removable, for example in order to clean out any deposits that may accumulate inside it. For this reason, the base of the rear wall 21d has a hook 27 which, in the mounted position, runs through a bottom notch in the housing 3c and is seated behind the bottom of the housing 3c. The tab 26 thus constitutes a grasping element that makes it possible to remove the container 12 from the housing 3c. To do this, one lifts the tab 26 slightly while tilting the rear wall 21d of the container so that the hook 27 is disengaged from the wall of the housing 3c, it being understood that the steam nozzle 7 is in the raised position.

The moving device 13, seen in its entirety in FIG. 2, is supported by a vertical axle 30. This axle 30 is immobilized relative to the body 2 by means of a bracket, not represented in the figures. A pivot drive motor 31 having a toothed wheel is also fixedly mounted relative to the body 2 by means of this bracket.

A pivot assembly 32 is rotatably mounted around the axle 30 and includes a toothed sector 33 which engages with the toothed wheel of the pivot drive motor 31. The pivot assembly 32 also has a lower arm 34, at the end of which is disposed a guide element 35 which guides the vertical sliding of the nozzle 7 relative to this arm 34, which does not move vertically. The distance between the axle 30 and the guide element 35, on the order of ten centimeters, constitutes a lever arm which makes it possible to move the nozzle 7 horizontally by several centimeters with a movement of relatively limited angular amplitude. The pivot assembly 32 thus forms a mechanism for moving the nozzle horizontally.

The assembly 32 also has a vertical drive motor 37 having a toothed wheel located at the level of vertical guides 38. The vertical guides 38 support a slide 39 forming a vertically moving mechanism, which has a rack and from which an upper arm 40 extends horizontally.

The upper end of the nozzle 7 is attached to the upper arm 40. The water or steam is fed into the nozzle 7 through this upper end via a conduit inside the arm 40, to which is connected a flexible conduit 42 connected to the steam and water feed device.

The operation of the vertical drive motor 37 makes it possible to move the end of the arm 40 from an upper position, as shown in FIG. 2, to a lower position like that shown in FIG. 5 and to an even lower position in which the free end 7a of the nozzle comes into contact with the bottom 20 of the container 12 for reasons explained below.

The moving device 13 thus makes it possible to move the steam nozzle 7 vertically in the beverage preparation area 10 so that it lowers into a cup. But thanks to the pivot drive motor 31, as seen more clearly in FIGS. 3 and 4, the nozzle 7 can be moved in the horizontal plane from the beverage preparation area 10 to the cleaning area 25 defined by the housing 3c. Once inside the cleaning area 25, the nozzle is situated facing the opening 22 of the container 12, and a vertical movement of same, similar to the movement into the cleaning area, can be activated by the electronic control unit. However, it is possible, for reasons of cost, to provide for some of these movements, particularly the horizontal movement, to be performed manually.

The cleaning product dispensing device 15 comprises a reservoir 50 and a first flexible conduit 51 leading to a dosing device 52, followed by a second flexible conduit 54 fitted onto the first end of a tube 56, the second end of this tube 56 forming the outlet for the cleaning product. The reservoir 50 is disposed in a high position relative to the rest of the cleaning liquid dispensing device so that it feeds the latter by gravity. The reservoir 50 is mounted by means of a flange to the top wall 2a of the body. A cap 58 makes it possible to fill the reservoir 50 without having to remove it from the body 2. But of course, it is entirely possible to provide a removable internal reservoir or cleaning product supplies in the form of replaceable cartridges.

The cleaning product is preferably a concentrated detergent product, particularly adapted to dissolve milk residue. It can also contain antimicrobial agents.

The dosing device 52 fed by gravity is a simple solenoid valve controlled by the electronic control unit. It could also be a particularly simple dosing pump whose unit volume corresponds to one dose of product since, as will be seen below, the cleaning system requires merely that a given dose be dispensed at a pressure corresponding to the atmospheric pressure. Unlike in other devices, it is not necessary to dispense under pressure a relatively even dose that must be mixed with a flow of liquid under pressure.

The tube 56 passes through the lower arm 34 so as to open vertically downward. It is noted that the tube 56 providing a cleaning product outlet is therefore rigidly joined to the lower arm 34, and more generally to the pivot assembly 32 that makes it possible to move the nozzle 7 horizontally. The tube 56 is carefully arranged so that its bottom opening is located above the top opening 22 of the rinsing container 12 when the nozzle 7 is in the preparation area 10, as may be seen in FIG. 3. When the moving device 13 places the nozzle 7 in the cleaning area 25, i.e. when it reaches the configuration shown in FIG. 4, the cleaning liquid outlet constituted by the tube 56 is moved rearward into a storage position. In this position, the liquid outlet is in a storage area 59 located inside the machine behind the facade 3 and outside the preparation and cleaning areas (10, 25), so there is no risk that any remaining cleaning product will fall into a cup or into the rinsing container 12.

Figure 4:
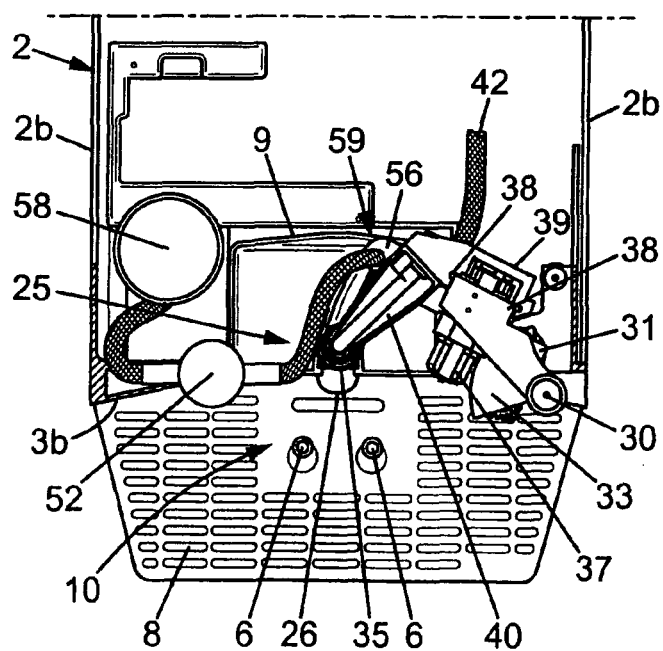
FIG. 4 is a view similar to FIG. 3 in which the cleaning system is in the cleaning configuration.

As may be seen in FIG. 4, the cleaning product outlet 56 placed in this storage area 59 sits above the collecting tray 9, given that the latter extends rearward beyond the housing 3c of the facade 3. Any remaining drops of cleaning product are then collected by the tray 9.

In the embodiment shown, the collecting tray 9 is formed of a single piece and has a single compartment for collecting any falling liquid passing through the cup rest 8 or the bottom opening of the housing 3c, or emerging from tube 56 providing the cleaning product outlet in the storage position. But it is conceivable to provide several collecting trays for fulfilling these various functions, or even to provide two or three compartments connected by overflow outlets for the various areas. However, the one-piece embodiment of the tray 9 and the ability to mount it in the machine by sliding it horizontally, as may be seen in FIG. 6, makes it more practical to use.

Various operating sequences of the above-described machine 1 will now be described.

For the preparation of a beverage, activated automatically by one of the buttons on the control panel 4, the steam nozzle 7 is initially placed in the preparation area 10 in a raised position, i.e. as shown in FIG. 1. If the activated preparation sequence includes a step for injecting steam into the beverage, or if it is simply a sequence using the steam nozzle 7, for example, to reheat a beverage, the moving device 13 actuated by the electronic control unit causes the free end 7a of the nozzle to be lowered until it is immersed in the beverage, but preferably without touching the bottom of the cup.

At the end of such a preparation sequence in which the nozzle 7 comes into contact with the beverage, the control unit is adapted to perform either a sequence for simply rinsing the nozzle or a sequence for cleaning it. However, it will be noted that the main advantages of the cleaning system described are obtained even if the cleaning and/or rinsing sequence is not initiated automatically after the preparation of a beverage, but initiated by pressing rinsing or cleaning buttons, and even if the steam nozzle 7 has to be pushed back into the cleaning area 25 manually before or during these sequences.

Figure 3:
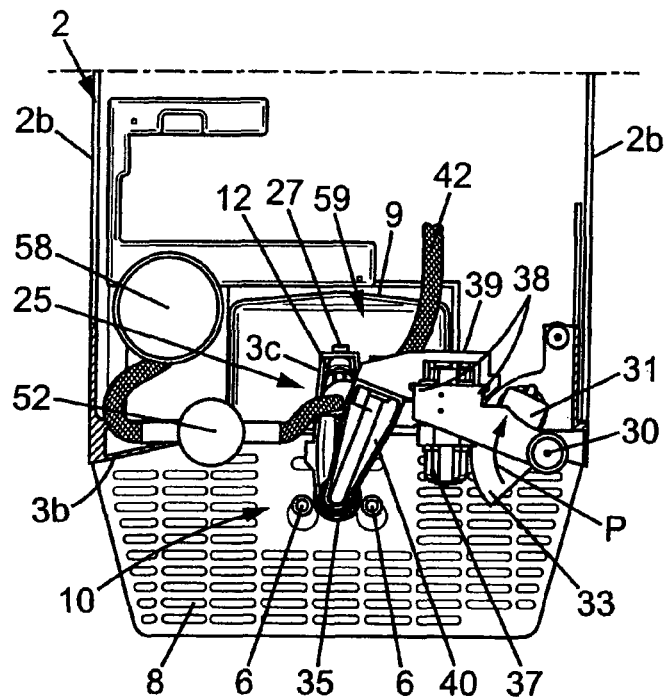
FIG. 3 is a partial cutaway top view of FIG. 1.

For an automatic rinsing sequence after the preparation of a beverage, the control unit causes the nozzle to be moved from the raised position in the preparation zone 10 to the cleaning area 25 by the pivot drive motor 31, which pivots the entire horizontally moving pivot assembly 32 in the direction of the arrow P in FIG. 3. The free end 7a of the steam nozzle is placed over the rinsing container, and is lowered into the latter by means of the vertical drive motor 37, which lowers the vertically moving mechanism 39 and the upper arm 40 to which the nozzle 7 is attached.

The rinsing container 12 is then filled by means of the nozzle 7 by activating the dispensing of water through the latter. The control unit is adapted so that the dispensed quantity of hot water, which constitutes the rinsing liquid, does not exceed a predetermined level of liquid, which must be located below the maximum level HLmax. It should be noted that the container can be filled with the steam nozzle in the raised position, but at the risk of causing hot water splashes outside the rinsing container 12.

The nozzle 7 is then immersed in the rinsing liquid, which makes it cleaner already given that the beverage present on its external surface has just been prepared, and that simply diluting this beverage with hot water makes it possible to eliminate most of it. It is advantageous, however, to perform an agitation of the liquid around the nozzle.

The agitation can consist of driving the nozzle in an up-and-down motion so that its free end 7a moves between this lowered position or an even lower position while preferably avoiding touching the bottom 20 of the container 12, and a higher position which does not necessarily reach the extreme upper position in which the nozzle was positioned inside the cleaning area 25. Activating three up-and-down movements of the nozzle inside the container is sufficient to optimize the rinsing of the nozzle.

The agitation can also be created by dispensing steam through the free end 7a of the nozzle immersed in the rinsing liquid. This produces relatively strong swirls in the rinsing liquid, which, along with the steam, clean the outer surface of the nozzle 7. These two possible methods of agitation may be combined, successively or simultaneously.

The free end 7a of the nozzle is then raised above the predetermined liquid level, and preferably above the maximum liquid level HLmax, so that the rinsing liquid present on the surface, and especially on the inside of the nozzle drips off. A short blast of steam can be emitted in order to make sure that the nozzle is drained.

After observing a predetermined pause corresponding to the drip-draining of the nozzle, the rinsing container 12 is drained in a particularly simple way by means of the draining device 23 described above. In essence, from this position it suffices to top off the level of liquid in the container 12 to the maximum level HLmax at a flow rate sufficient to fill the bend 24b of the conduit 24 and activate the siphon. Once the siphon is activated, the dirty rinsing liquid is drained to the level of the inlet 24a, meaning that the container is more or less completely drained depending on the position of the inlet. Of course, the draining of the container 12 could be triggered with the free end 7a of the nozzle immersed in the liquid, especially if the drip-draining step is not provided.

It should be noted that other draining devices can be adopted with the moving device 13 and the container 12 arranged as described above. In fact, it is possible, for example, to provide a valve on the bottom 20 of the container 12 and to trigger the opening of same by lowering the free-end 7a of the nozzle so as to bring it into contact with this valve.

If the nozzle 7 is not in the raised position after the draining of the container, it is then raised so that it can be repositioned in the preparation area 10 by pivoting, without hitting the container 12. However, before repositioning the nozzle 7, the rinsing sequence can be repeated once or twice to improve the rinsing. Two successive rinsing sequences performed immediately after a beverage preparation sequence make it possible to obtain a satisfactory result while limiting the quantity of water used, consequently optimizing the self-contained nature of the machine, in terms of both the level of its water tank and the fill level of the collecting tray 9.

If necessary, the rinsing sequence can be replaced by an actual cleaning sequence followed by one or more rinsing sequences, preferably three rinsing sequences to ensure that no trace of cleaning product remains on the nozzle.

The cleaning sequence starts with the dispensing of the cleaning product, even before the nozzle 7 is moved from the preparation area 10 to the cleaning area 25. In fact, in order to dispense a cleaning product into the rinsing container 12, it is necessary for the product outlet 56 to be located above the opening 22 of the container, and consequently for the lower arm 34 to be in an angular position corresponding to FIG. 3. The dosing of the cleaning product is performed by leaving the dosing device 52 open for a given amount of time, which allows relatively precise dosing given the low flow rate obtained in the flow from the reservoir 50 by gravity.

Once the dose of cleaning product is dispensed, and possibly after a pause, the pivot assembly 32 is pivoted by the pivot drive motor 31 so as to place the nozzle over the rinsing container 12 as shown in FIG. 4, i.e. as though initiating a rinsing sequence and prior to the actual rinsing. It should be noted that in this configuration the product outlet 56 is in the storage position over the collecting tray 9. Consequently, if any remaining cleaning product drips down, it is of no consequence.

From this position, the cleaning sequence proceeds in accordance with exactly the same steps as the rinsing sequence, except that this time the rinsing liquid constituted by hot water is mixed with the cleaning product so as to constitute a cleaning solution that acts on the residue on the nozzle.

At the end of the cleaning sequence, i.e. after the evacuation of the cleaning solution, at least one rinsing sequence is systematically performed so that no traces of product will affect the flavor or the appearance of a beverage prepared afterwards. In order to have a high degree of reliability that such traces will be absent, three rinsing sequences are performed after a cleaning sequence.

This cleaning sequence can of course be activated at the initiative of the user, but for a use that is more automatic, and hence as easy as possible for the user, while optimizing the consumption of water and the machine's self-contained supply of cleaning product, the cleaning sequence is triggered only under certain conditions. These conditions can include a number of beverage preparation cycles performed since the last cleaning sequence. For example, the electronic control unit can count the preparation cycles in order to schedule a cleaning sequence after ten beverage preparation cycles involving the steam nozzle 7. The triggering of the cleaning sequence can also be controlled by counting an amount of time elapsed since the last cleaning sequence, for example triggering it automatically if 24 hours or 7 days have elapsed since the last cleaning sequence. These two types of conditions can advantageously be combined so as to obtain the best possible compromise between the cleanness of the nozzle and the consumption of water and cleaning product, its activation being triggered as soon as either of the two conditions is reached.

It is clear that the range of vertical motion of the free end 7a of the nozzle must be fairly precisely controlled, particularly in order to produce an agitation of the nozzle of relatively high amplitude without hitting the bottom 20 of the container 12.

For this reason, a sequence for calibrating the moving device 13 in the vertical direction is carried out in the following way: the steam nozzle 7 is lowered into the cleaning area 25 until its free end 7a comes to abut against the bottom 20 of the rinsing container 12. This abutting position is identified and stored by the electronic control unit, which analyzes the current used by the vertical drive motor 37. In an intrinsically known way, a peak intensity of the current consumed by this motor indicates that the abutting position has been reached. By storing the maximum lowered position in the form of a power-on time of the motor since the upper position, or in the form of a number of rotations performed, it is possible to avoid touching the bottom of the container again, and especially to avoid touching the bottom of a cup. The latter point is more important given that certain cups can be relatively fragile and that dispensing steam into a cup with the nozzle 7 abutting against the bottom can result in spattering. Meanwhile, the rinsing container 12, provided for this machine and for a very specific use, can be sized so that its bottom 20 can easily withstand such a calibration sequence.

Of course, the exemplary embodiment described above is not in any way limiting. It is understood that not all of the aspects described are necessarily used when performing a simplified cleaning of a steam nozzle; in particular, it is possible to provide for the horizontal movement from the preparation area 10 to the cleaning area 24 [sic] not only to be actuated manually, but to be performed manually by pushing the nozzle back, thus eliminating the need for an electric actuator. Furthermore, it is also clear that the nozzle 7 is not necessarily a steam nozzle in the sense normally understood for an espresso coffee machine, but could also be a nozzle that dispenses milk, or a ready-made beverage.

The invention claimed is:

1. Beverage preparation machine comprising:
   a body (2);
   a movable steam nozzle (7) connected to the body by a moving device (13) for moving the nozzle;
   a beverage preparation area (10) in which a cup for receiving a beverage can be placed; and
   a cleaning area (25) which is separate from the preparation area and in which is disposed at least one rinsing container (12) for the nozzle (7), the moving device (13) being capable of moving the nozzle between the preparation and cleaning areas (10, 25),
   wherein said machine also includes a cleaning product outlet (56) that can be moved between a dispensing position located in the cleaning area (25) for dispensing a cleaning product into the container (12), and a storage position located in a storage area (59) separate from the cleaning area (25), and wherein the cleaning product outlet (56) is connected to the moving device (13) for moving the nozzle (7) by a linkage (34) capable of placing said outlet (56) in the storage area when the nozzle is placed in the cleaning area (25).

2. Machine according to claim 1, wherein the linkage between the nozzle (7) and the cleaning product outlet (56) is rigid.

3. Machine according to claim 2, wherein the body (2) comprises a housing (3c) delimiting the cleaning area (25), said housing being arranged so as to receive the nozzle (7) and to allow the nozzle to be inserted into the rinsing container (12), while preventing the insertion of a standard size cup into the cleaning area (25) delimited by said housing.

4. Machine according to claim 3, wherein the rinsing container (12) is removably mounted in the housing (3c) delimiting the cleaning area (25).

5. Machine according to claim 4, wherein the cleaning product outlet (56) is located inside the body (2) in the storage position.

6. Machine according to claim 5, wherein the rinsing container (12) includes a draining device (23) capable of evacuating liquid contained in said rinsing container.

7. Machine according to claim 6, wherein the moving device (13) is an electromechanical device automatically controlled by an electronic control unit, the moving device including a horizontally movable mechanism (32), which is capable of moving the nozzle (7) from the beverage preparation area (10) to the cleaning area (25).

8. Machine according to claim 7, wherein the moving device (13) further includes a vertically movable mechanism (39) supported by the horizontally movable mechanism (32) and capable of moving the nozzle (7) from an upper position to a lower position in which the nozzle enters either the cup for receiving a beverage or the rinsing container (12).

9. Machine according to claim 8, wherein the cleaning product outlet is formed by an opening of a tube (56) connected to an electromechanical valve (52) controlled by the electronic control unit.

10. Machine according to claim 9, wherein the cleaning product is a concentrated liquid contained in a reservoir (10) that is located above the cleaning product outlet (56) and feeds the cleaning product outlet by gravity.

11. Machine according to claim 2, wherein the linkage is formed by an arm (34) that pivots around a vertical axle (30).

12. Machine according to claim 5, wherein the storage position is above a collecting tray (9).

13. Machine according to claim 7, wherein the horizontally moving mechanism (32) is formed by an arm (34) pivoting around a vertical axle (30).

14. Machine according to claim 1, wherein the body (2) comprises a housing (3c) delimiting the cleaning area (25), said housing being arranged so as to receive the nozzle (7) and to allow the nozzle to be inserted into the rinsing container (12), while preventing the insertion of a cup into the cleaning area (25) delimited by said housing.

15. Machine according to claim 14, wherein the rinsing container (12) is removably mounted in the housing (3c) delimiting the cleaning area (25).

16. Machine according to claim 1, wherein the cleaning product outlet (56) is located inside the body (2) in a storage position.

17. Machine according to claim 1, wherein the rinsing container (12) includes a draining device (23) capable of evacuating liquid contained in said rinsing container.

18. Machine according to claim 1, wherein the moving device (13) is an electromechanical device automatically controlled by an electronic control unit, the moving device including a horizontally movable mechanism (32), which is capable of moving the nozzle (7) from the beverage preparation area (10) to the cleaning area (25).

19. Machine according to claim 18, wherein the moving device (13) further includes a vertically movable mechanism (39) supported by the horizontally movable mechanism (32) and capable of moving the nozzle (7) from an upper position to a lower position in which the nozzle enters either the cup for receiving a beverage or the rinsing container (12).

20. Machine according to claim 1, wherein the cleaning product outlet is formed by an opening of a tube (56) connected to an electromechanical valve (52) controlled by an electronic control unit.

21. Machine according to claim 1, wherein the cleaning product is a concentrated liquid contained in a reservoir (10) that is located above the cleaning product outlet (56) and feeds the cleaning product outlet by gravity.

* * * * *